United States Patent
Rudolf et al.

(10) Patent No.: US 11,634,025 B2
(45) Date of Patent: Apr. 25, 2023

(54) MECHANISM FOR PIVOTING A CHARGING OR TANK FLAP, AN ARRANGEMENT INCLUDING A CHARGING OR FILLER NECK HOUSING, AT LEAST ONE CHARGING OR TANK FLAP, AND AT LEAST ONE SUCH MECHANISM, AND A VEHICLE HAVING AT LEAST ONE SUCH ARRANGEMENT

(71) Applicant: ILLINOIS TOOL WORKS INC., Glenview, IL (US)

(72) Inventors: Andreas Rudolf, Eibelstadt (DE); Zsolt Wilke, Bad Mergentheim (DE); Matthias Hegwein, Ippesheim (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/380,618

(22) Filed: Jul. 20, 2021

(65) Prior Publication Data
US 2022/0034146 A1    Feb. 3, 2022

(30) Foreign Application Priority Data
Jul. 31, 2020 (DE) ..................... 10 2020 120 242.3

(51) Int. Cl.
*B60K 15/05* (2006.01)

(52) U.S. Cl.
CPC ........ *B60K 15/05* (2013.01); *B60K 2015/053* (2013.01); *B60K 2015/0515* (2013.01);
(Continued)

(58) Field of Classification Search
CPC .. B60K 15/05; B60K 15/053; B60K 15/0507; B60K 2015/0515; B60K 2015/0546;
(Continued)

(56) References Cited

U.S. PATENT DOCUMENTS 9,688,137 B2 *  6/2017  Takahashi .............. B60K 15/05
2017/0368928 A1 * 12/2017  Mori ..................... B60K 15/05

FOREIGN PATENT DOCUMENTS

DE        4438610 A1     5/1996
DE     202016105735 U1 * 12/2016 ............. B60K 15/05
(Continued)

OTHER PUBLICATIONS

Dr. Kunststoffwerke, Schneider, "Device for opening and closing a tank flap", Dec. 1, 2016, Edition: DE-202016105735-U1, German Patent Office (Year: 2016).*

*Primary Examiner* — Dennis H Redder
*Assistant Examiner* — Joyce Eileen Hill
(74) *Attorney, Agent, or Firm* — Thompson Hine LLP (57) ABSTRACT

A mechanism (1) for pivoting a charging or tank flap (2) on a charging or filler neck housing (3), which is accommodated or can be accommodated in a body component of a motor vehicle, wherein the mechanism (1) is configured, by superposing at least two at least temporarily simultaneous circular rotational movements having different rotation radii or at least one at least temporarily simultaneous circular rotational movement and at least one linear movement, to pivot the charging or tank flap (2) reversibly between a first orientation, in particular a closed position of the charging or tank flap (2), and a second orientation, in particular an open position of the charging or tank flap (2).

14 Claims, 4 Drawing Sheets

(52) U.S. Cl.
CPC . *B60K 2015/0538* (2013.01); *E05Y 2201/626* (2013.01); *E05Y 2900/534* (2013.01); *Y02T 90/14* (2013.01)

(58) Field of Classification Search
CPC ..... B60K 2015/0538; B60K 2015/0454; E05F 7/00; E05Y 2201/626; E05Y 2900/534; E05Y 2201/622; Y02T 90/14
USPC .......................... 296/97.22; 49/386; 320/109
See application file for complete search history.

(56) References Cited

FOREIGN PATENT DOCUMENTS

| | | |
|---|---|---|
| DE | 102017223396 A1 | 6/2019 |
| DE | 102019100787 A1 | 7/2020 |

* cited by examiner

MECHANISM FOR PIVOTING A CHARGING OR TANK FLAP, AN ARRANGEMENT INCLUDING A CHARGING OR FILLER NECK HOUSING, AT LEAST ONE CHARGING OR TANK FLAP, AND AT LEAST ONE SUCH MECHANISM, AND A VEHICLE HAVING AT LEAST ONE SUCH ARRANGEMENT

TECHNICAL FIELD

The present invention relates to a mechanism for pivoting a charging or tank flap on a charging or filler neck housing, which is accommodated or can be accommodated in a body component of a motor vehicle, and an arrangement consisting of a charging or filler neck housing, at least one charging or tank flap and at least one such mechanism. The present invention further relates to a motor vehicle comprising at least one such arrangement.

The motor vehicle is in particular a vehicle with a hybrid or electric drive, but purely internal combustion engine driven vehicles are not excluded in the context of the present invention.

BACKGROUND

Vehicles with a hybrid or electric drive have at least one battery or traction battery, which, for example in the case of PHEV vehicles (PHEV=plug-in hybrid electric vehicle) or BEV vehicles (BEV=battery electric vehicle), can be charged via an electrical charging connector that is accessible from the outside on the vehicle body, and is typically a charging socket, by connecting to an electrical charging station, for example, or a conventional external electrical terminal.

The charging connector is usually disposed in a charging housing of the vehicle body, which is covered or closed by a charging flap or a charging closure element. A mechanism that cooperates with the charging flap or the charging closure element selectively allows the charging housing to be opened and closed or the charging flap or the charging closure element to be flipped open and closed relative to the charging housing, and thus allows access to the charging connector.

In internal combustion engine driven vehicles, a fuel tank is supplied with fuel via a tank filler neck, which is accessible from the outside by connection to a fuel pump or a fuel nozzle, for example. Like the charging connector, the tank filler neck is typically disposed in a filler neck housing which is associated with the vehicle body and is covered or closed by a tank flap or a tank closure element. Here too, a mechanism that cooperates with the tank flap or the tank closure element selectively allows the filler neck housing to be opened and closed or the tank flap or the tank closure element to be flipped open and closed relative to the filler neck housing, and thus allows access to the tank filler neck.

In conventional arrangements consisting of a charging or tank flap and a charging or filler neck housing connected to one another via a mechanism, the mechanism often only allows the charging or tank flap to be flipped open relative to the charging or filler neck housing by a 90° angle in the direction of a body component that accommodates the charging or filler neck housing. Even though the charging or filler neck housing is generally free for charging or refueling when the charging or tank flap is open 90°, due to the geometric configuration of a charging plug or a fuel nozzle or a positioning of a motor vehicle relative to the charging station or the fuel pump, it can be difficult to plug in or insert the charging plug or the fuel nozzle.

It is also conceivable for the charging flap to accidentally be moved beyond its maximum pivoting position if the plug or nozzle is plugged in or inserted improperly, and the mechanism for flipping open and closed the flap to be damaged or completely destroyed in the process.

In such conventional arrangements, to obtain a pivot or opening angle of the charging or tank flap larger than the aforementioned 90°, a highly complicated mechanism consisting of many different subcomponents has to necessarily be used. In addition to its complexity, such a mechanism is often relatively unstable, very costly and requires a very large amount of installation space, which is often not available.

Conventional arrangements consisting of a charging or tank flap and a charging or filler neck housing connected to one another via a mechanism moreover have the problem that, during charging or refueling, the charging or filler neck housing, in particular the charging connector or the tank filler neck and the charging plug or the fuel nozzle, are exposed to weather effects without protection. With a fixed 90° opening angle of the charging or tank flap, rain, snow, hail or strong wind can enter the area directly between the charging or tank flap and the charging or filler neck housing unhindered, and thus (in the long term) cause damage to components involved in charging or refueling or lead to premature aging of materials from which the charging or filler neck housing or other components are made.

SUMMARY

It is therefore an object of the present invention to provide a mechanism for pivoting a charging or tank flap on a charging or filler neck housing, which is accommodated or can be accommodated in a body component of a motor vehicle, which, on the one hand, allows easy access to the charging or filler neck housing for charging or refueling and, on the other hand, makes it possible to move the charging or tank flap into a so-called weather protection position in which the charging or filler neck housing and any components involved in charging or refueling are reliably protected from weather effects.

The present invention accordingly relates in particular to a mechanism for pivoting a charging or tank flap on a charging or filler neck housing, which is accommodated or can be accommodated in a body component of a motor vehicle, wherein the mechanism is configured, by superposing at least two at least temporarily simultaneous circular rotational movements having different rotation radii or at least one at least temporarily simultaneous rotational movement and at least one linear movement, to pivot the charging or tank flap reversibly between a first orientation, in particular a closed position of the charging or tank flap, and a second orientation, in particular an open position of the charging or tank flap.

The mechanism according to the invention makes it possible to implement a pivoting of the charging or tank flap with an extremely small installation space requirement by superposing or overlaying at least two movements, wherein, compared to conventional mechanisms, a significantly larger pivot angle of the charging or tank flap relative to the charging or filler neck housing is achieved with the same movement path traveled by the mechanism. In addition, after charging or refueling has been initiated, the mechanism allows the charging or tank flap to pivot into a so-called weather protection position, so that an area between the charging or filler neck housing and the charging or tank flap and any other components involved in charging or refueling are reliably protected from weather effects.

According to an advantageous further development of the mechanism according to the invention, it is provided that the mechanism is configured, during pivoting from the first orientation into the second orientation, to simultaneously lift the charging or tank flap from the charging or filler neck housing and rotate it in the direction of the body component.

The special mode of action of the mechanism can force the charging or tank flap into its complex movement or pivot pattern, as a result of which the increased pivot angle of the charging or tank flap compared to conventional mechanisms is achieved. This movement or pivot pattern of the charging or tank flap is preferably achieved in that the mechanism superposes or overlays at least two circular rotational movements having different rotation radii via a special coupling to the charging or filler neck housing on the one side and the charging or tank flap on the other side. The characteristic movement or pivot pattern of the charging or tank flap is characterized in that, on the one hand, the charging or tank flap lifts up or away from the charging or filler neck housing (i.e. moves orthogonally away from a surface of a body component surrounding the charging or filler neck housing) and at the same time rotates in the direction of the body component (i.e. around an axis of rotation which extends parallel to the surface of the body component).

Alternatively to the preferred embodiment of superposed circular rotational movements, it is also conceivable for the mechanism to transfer the charging or tank flap into its characteristic movement pattern by superposing at least one circular rotational movement and at least one linear movement.

According to an advantageous further development of the mechanism according to the invention, it is provided that the mechanism is rotatably mounted on the charging or tank flap on the one side and on the charging or filler neck housing on the other side.

The rotatable mounting of the mechanism on the charging or tank flap and the charging or filler neck housing makes it possible to achieve the special kinematic coupling of the components of the arrangement to one another, which enables the movements produced by the mechanism to be superposed or overlaid such that the movement path, in particular the pivot angle, of the charging or tank flap is greater than the movement path, in particular a rotation angle, of the mechanism.

According to an advantageous further development of the mechanism according to the invention, it is provided that the mechanism is configured to pivot the charging or tank flap into a third orientation, wherein the third orientation corresponds to an orientation of the charging or tank flap between the first and the second orientation.

Such a third orientation corresponds to the weather protection position in which, for example during charging or refueling, the charging or tank flap is pivoted only so much that the charging or filler neck housing and all components involved in charging or refueling are protected from any weather effects, in particular rain, snow, hail or strong wind.

According to an advantageous further development of the mechanism according to the invention, it is provided that a rotation angle of the mechanism corresponds to a first rotation angle range and a rotation angle of the charging or tank flap corresponds to a second rotation angle range, wherein the rotation angle of the mechanism is always smaller than the rotation angle of the charging or tank flap.

It is thus possible to ensure a significantly increased rotation angle or pivot angle of the charging or tank flap with a small movement of the mechanism, so that access to the charging or filler neck housing and comfort during charging or refueling are significantly improved.

According to an advantageous further development of the mechanism according to the invention, it is provided that the mechanism comprises a first lever and a second lever, wherein the first lever and the second lever are each rotatably mounted on the charging or tank flap on the one side and on the charging or filler neck housing on the other side, in particular with a first end and a second end opposite to the first end, and wherein the mounting points of the first lever and the second lever on the charging or tank flap on the one side and the charging or filler neck housing on the other side are spaced apart from one another.

The configuration of the mechanism in the form of two levers (or lever arms), said levers respective rotatable connection or mounting to the charging or tank flap on the one side and the charging or filler neck housing on the other side and the spaced positioning of the mounting points makes it possible to produce a so-called four-point kinematics, so that superposing or overlaying at least two movements of the levers produces the characteristic movement or pivot pattern of the charging or tank flap to pivot the charging or tank flap. The ratio of the rotation angle of the mechanism or the lever to the rotation angle or pivot angle of the flap can be varied or set via the selection of the spacing of the mounting points from one another.

It is in particular provided that the mechanism is configured to superpose exactly two circular rotational movements having different rotation radii, wherein the first lever and the second lever are configured to respectively carry out one of these circular rotational movements around their respective mounting point on the charging or filler neck housing in a first or a second direction of rotation, and wherein the first lever carries out a circular rotational movement having a rotation radius that is greater than a rotation radius of a circular rotational movement carried out by the second lever.

The two levers of the mechanism thus describe different circular paths with their rotational movements around their mounting points on the charging or filler neck housing, wherein the characteristic pivoting movement of the charging or tank flap consisting of two partial movements (lifting+rotating) is produced by the rotatable mounting of the two levers on the charging or tank flap. Compared to a conventional mechanism having only one lever that can rotate, the four-point kinematics connection and the resulting overlaying of the rotational movements of two levers makes it possible to obtain a significantly larger pivot angle for the charging or tank flap with the same rotation angle of the mechanisms. Open positions of the charging or tank flap of more than 90° relative to a closed position of the charging or tank flap can thus be achieved, which would not be possible at all with a conventional mechanism having only one lever or would require such a large installation space in the region of the vehicle body, that such a mechanism would not be economically feasible.

According to an advantageous further development of the mechanism according to the invention, it is provided that a pivoting of the charging or tank flap from the first orientation into the second orientation corresponds to a pivoting movement of the charging or tank flap by a pivot angle of approximately 155° in the direction of the body component, and a pivoting of the charging or tank flap from the first orientation into the third orientation corresponds to a pivoting movement of the charging or tank flap by a pivot angle of approximately 80° in the direction of the body component.

The second orientation of the charging or tank flap corresponds to a rotation angle of the levers of approximately 100° in the first direction of rotation and the third orientation of the charging or tank flap corresponds to a rotation angle of the levers of approximately 55° in the first direction of rotation.

In this context, the statement "approximately" is to be understood to be a deviation of +/−10° from the stated angle.

A flipping or pivoting open of the charging or tank flap by a pivot angle of approximately 155° (+/−10°), in particular exactly 155°, allows easy initiation of charging or refueling without potential complications when plugging in or inserting a charging plug or a fuel nozzle resulting from a too small opening angle of the charging or tank flap. As previously noted, pivoting the charging or tank flap by a rotation angle of approximately 80° (+/−10°), in particular exactly 80°, enables the charging or tank flap to be oriented such that the weather protection position is achieved, which prevents rain, snow, hail or strong wind from entering the area between the charging or filler neck housing and the charging or tank flap.

By rotating or turning the levers around their respective mounting point on the charging or filler neck housing by a rotation angle of approximately 100° (+/−10°), in particular exactly 100°, the charging or tank flap can be pivoted open out of its closed position by approximately 155° (+/−10°), in particular exactly 155°, and by rotating or turning the levers around their respective mounting point on the charging or filler neck housing by approximately 55° (+/−10°), in particular exactly 55°, a weather protection position of the charging or tank flap (pivot angle of the charging or tank flap approximately (+/−10°), in particular exactly, 80°) can furthermore be achieved.

Because the mechanism according to the invention allows reversible pivoting of the charging or tank flap, the aforementioned angle specifications should also be understood to mean that the charging or tank flap can be pivoted out of the second orientation by approximately 75° (+/−10°), in particular exactly 75°, against the direction toward the body component, to thus be shifted from the second orientation into the third orientation. The charging or tank flap can furthermore also be pivoted out of the second orientation by approximately 155° (+/−10°), in particular exactly 155°, against the direction toward the body component, to thus be shifted from the second orientation back into the first orientation. The aforementioned angle specifications with respect to the levers should likewise be understood to mean that the levers can rotate or turn in the second direction of rotation by corresponding angular amounts (approximately (+/−10°), in particular exactly, 45° and approximately (+/−10°), in particular exactly, 100°) to shift the charging or tank flap out of the second orientation into the third orientation, for example, or out of the second orientation back into the first orientation.

However, the aforementioned angle specifications should not be understood to be limiting; rather, the second position can generally correspond to a rotation angle or pivot angle of the charging or tank flap in a range between 110° and 180°, and the third position can generally correspond to a rotation angle or pivot angle of the charging or tank flap in a range between 60° and 100°, relative to the first position (closed position) of the charging or tank flap. The rotation angle of the levers is reduced or increased accordingly, but always subject to the condition that the rotation angle of the mechanism or the lever is smaller than the rotation angle or pivot angle of the charging or tank flap.

According to an advantageous further development of the mechanism according to the invention, it is provided that the first lever and the second lever are configured complementarily to one another such that the second lever is accommodated or can be accommodated at least partly in the first lever.

It is preferably provided that the second lever is configured such that, in a state of the second lever in which it is accommodated in the first lever, an opening formed in the first lever for accommodating the second lever is covered at least partly by the second lever.

This makes it possible to achieve an extremely compact arrangement of the mechanism, wherein, in particular in an installed position or in an installed state of the mechanism in an arrangement, the two levers can be disposed close to one another and still be able to carry out their respective rotational movement without colliding with one another.

The special, overlapping configuration of the second lever further serves the purpose of protecting the mechanism itself from weather effects, such as rain, snow, hail or strong wind, during the rotation process for pivoting the charging or tank flap. The second lever in particular comprises a specially configured surface which projects beyond the actual outer contour of the second lever, such that, in a state of the second lever in which it is accommodated in the first lever, this surface also at least partly covers the outer contour of the first lever and thus closes the opening for accommodating the second lever in the first lever, so that any fluids or snow can be guided past the mechanism and not damage it.

According to an advantageous further development of the mechanism according to the invention, it is provided that the first lever and the second lever are both curved, in particular gooseneck-shaped.

This special design favors the arrangement of the levers relative to one another, so that the levers can carry out their respective rotational movement unimpeded, yet creates a mechanism that is compact in itself, requiring only a small amount of installation space. This configuration furthermore also contributes to producing the characteristic movement or pivot pattern of the charging or tank flap by means of the mechanism.

According to an advantageous further development of the mechanism according to the invention, it is provided that the first lever and the second lever are respectively rotatably mounted by means of a support pin or bearing pin on the charging or tank flap on the one side and the charging or filler neck housing on the other side.

Such a configuration enables a very easy to implement rotatable mounting of the levers on the charging or tank flap and the charging or filler neck housing that is very low-maintenance, very inexpensive, yet very robust, so that, even for a high number of pivoting movements of the charging or tank flap, the mounts essential to the four-point kinematics connection and the components essential to the mounts exhibit only minor signs of wear.

According to an advantageous further development of the mechanism according to the invention, it is provided that the movements superposed by the mechanism are non-uniform.

This enables the implementation of additional functions, such as gentle opening and/or closing of the charging or tank flap (soft opening/soft closing), rapid pivoting of the charging or tank flap between its end positions or end orientations and/or pivoting of the charging or tank flap against a resistance (ice barrier or strong wind). If necessary, an additional gear component or an additional gearing, for example a Maltese cross type gear, which is coupled to the mechanism or to a/the lever of the mechanism to be driven can be provided to produce such a non-uniform movement.

According to an advantageous further development of the mechanism according to the invention, it is provided that a pivoting of the charging or tank flap is initiated by actuating the mechanism, in particular the first lever, wherein the mechanism, in particular the first lever, can be actuated manually, using spring force, using a Bowden cable and/or using an electric motor.

Actuating the mechanism produces at least one movement of the mechanism, wherein the mounting of the mechanism on the charging or tank flap on the one side and the charging or filler neck housing on the other side directly produces at least one second movement. These at least two movements are superposed so that the charging or tank flap is forced into its characteristic pivot pattern. The mechanism is preferably actuated by actuating the first lever such that said lever rotates around its mounting point on the charging or filler neck housing. Due to the rotatable connection or mounting of the first and the second lever to the charging or tank flap, this rotational movement of the first lever is transmitted directly to the second lever such that it too rotates around its mounting point on the charging or filler neck housing in a first direction of rotation corresponding to the first lever. The rotatable connection of the levers to the charging or tank flap enables the two rotational movements of the levers to be superposed or overlaid such that, on the one hand, the flap is lifted or moved orthogonally away from a surface of the body component and at the same time rotates in the direction of the body component.

According to a further aspect of the invention, an arrangement is provided, which consists of a charging or filler neck housing that is accommodated or can be accommodated in a body component, at least one charging or tank flap, and at least one mechanism according to the type described above.

According to a further aspect of the invention, a motor vehicle having at least one arrangement according to the type described above is provided as well.

BRIEF DESCRIPTION OF THE DRAWINGS

One example embodiment of the mechanism according to the invention and the arrangement according to the invention are described in more detail in the following with reference to the accompanying drawings.

The figures show.

Unless otherwise indicated, in the figures, the same reference signs refer to similar or corresponding objects.

DETAILED DESCRIPTION

The mechanism according to the invention and the arrangement according to the invention are described in the following with reference to the illustrations in FIG. 1 through FIG. 5C.

It must first be noted that, even though the mechanism according to the invention is described in the present invention in the context of charging or tank flaps and charging or filler neck housings, in principle it is also possible to use the mechanism according to the invention to pivot any flap intended to close or free an opening or housing.

For the sake of clarity, the terms "flap" and "housing" are used in the following detailed description to stand for the terms "charging or tank flap" and "charging or filler neck housing".

Figure 1:
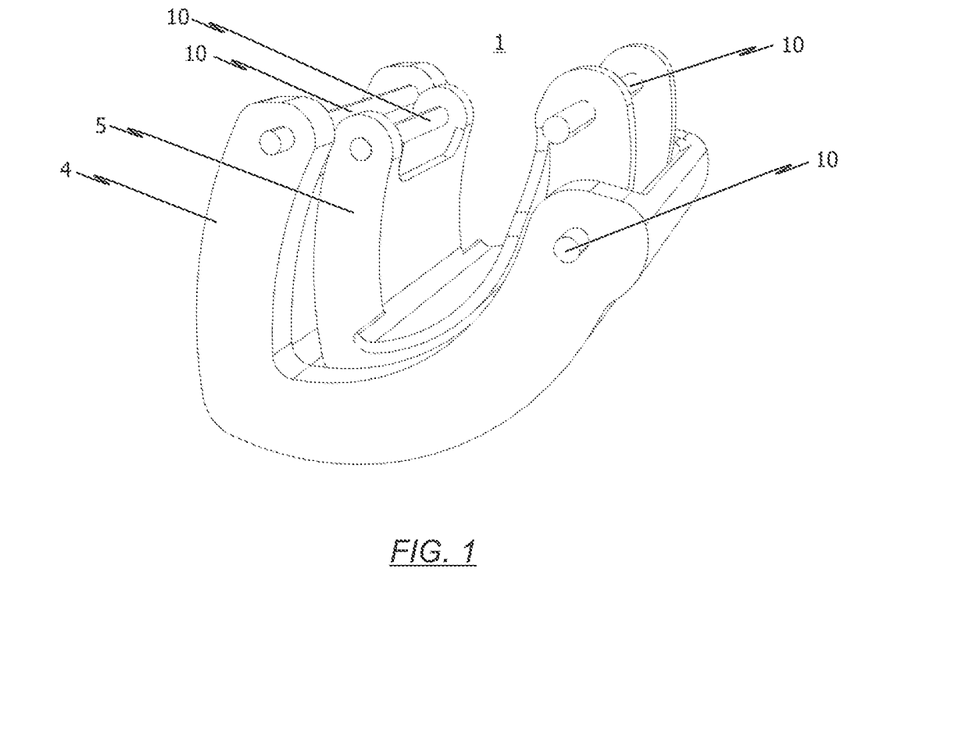
FIG. 1 schematically and in an isometric view, an example embodiment of the mechanism according to the invention.

FIG. 1 shows an isometric view of the mechanism 1 according to the invention, in which said mechanism is shown detached from a flap 2 and a housing 3. To illustrate the operating principle of the mechanism 1, the mechanism 1 shown in FIG. 1 is described in more detail in the following taking into account the illustrations in FIGS. 2 to 5C.

The operating principle of the mechanism 1 can be summarized in a nutshell such that, by superposing or overlaying at least two circular rotational movements having different rotation radii or at least one circular rotational movement and at least one linear movement, a flap 2, which is or can be connected to a housing 3 by means of the mechanism 1, can be pivoted reversibly between a first orientation and a second orientation relative to housing 3. A first orientation of the flap 2 here in particular describes a closed position of the flap 2, wherein the flap 2 is oriented or disposed relative to the housing 3 such that the flap 2 closes an opening defined by the housing 3. A second orientation of the flap 2 furthermore describes an open position or access position, wherein the flap 2 is pivoted or swung open relative to the housing 3 such that the housing 3 or the opening defined by the housing 3 is free which allows a charging plug of a charging station or a fuel nozzle of a fuel pump to be plugged or inserted into the housing 3, in particular into a charging plug or tank filler neck disposed in the housing 3.

"Superposing or overlaying", in this context, means that the movements that are overlaid are at least temporarily simultaneous, preferably continuously simultaneous (i.e. throughout the entire pivoting process of the charging or tank flap).

Superposing or overlaying at least two movements makes it possible to swing the flap 2 open significantly further, or with a significantly larger pivot angle, than is possible in conventional arrangements consisting of a flap and a housing, which are connected to one another via a mechanism. According to the present invention, it is provided that a rotation angle of the mechanism 1, which corresponds to a first rotation angle range, is always smaller than a rotation angle or pivot angle of the flap 2, which corresponds to a second rotation angle range. Unlike conventional arrangements, in its second orientation, i.e. its open position, the flap 2 according to the present invention is pivoted or swung open not only by 90° relative to the housing 3, but rather by a pivot angle of approximately 155° (+/−10°), in particular exactly 155°. It is thus possible to free the housing 3 or the opening defined by the housing 3 such that a charging plug or a fuel nozzle can be plugged in or inserted without difficulty and independent of a possible orientation of a motor vehicle relative to the charging station or fuel pump.

Such an increased pivot angle of the flap 2 is realized by the fact that the mechanism 1 is rotatably mounted to the flap 2 on the one side and to the housing 3 on the other side, and thus at least two movements produced in or by the mechanism 1 can be superposed or overlaid such that, on the one hand, the flap 2 lifts or is lifted away from the housing 3, i.e. is moved orthogonally away from a surface of a body component that accommodates and surrounds the housing 3 (not shown in the FIGS.), and, on the other hand, is rotated in the direction of a body component that accommodates the housing 3, i.e. around an axis of rotation which extends parallel to the surface of the body component. As a result of overlaying these two inherently separate movements of the flap 2 produced by superposing or overlaying the movements of the mechanism 1, a significantly increased pivot angle of the flap 2 relative to the housing 3 can be achieved with approximately the same movement path of the mechanism 1 than is permitted by conventional mechanisms for pivoting a flap.

The flap 2 can also be pivoted by the mechanism 1 into a third orientation, wherein the third orientation of the flap 2 corresponds to a so-called weather protection position of the flap 2. This third orientation of the flap 2 corresponds to a pivot angle of the flap 2 of approximately 80° (+/−10°), in particular exactly 80°, in the direction of the body component. Such a pivot angle smaller than 90° cannot be implemented as easily with conventional mechanisms.

Thus, after inserting or plugging a charging plug or a fuel nozzle into a charging connector or a tank filler neck, the mechanism 1 according to the invention enables the flap 2 to be pivoted such that an area between the housing 3 and the flap 2 and also the other components involved in charging or refueling, such as the charging plug, the fuel nozzle, the charging connector and/or the tank filler neck, are reliably protected from weather effects, such as rain, snow, hail or strong wind. Once charging or refueling has been completed, the flap 2 can then be pivoted again such that it assumes its second orientation, the so-called open position, so that a charging plug or a fuel nozzle can easily be removed again. After these components have been removed, the flap 2 can be pivoted back into its first orientation so that the flap 2 closes the housing 3 or the opening defined by the housing 3 or the charging plug or the tank filler neck.

According to a preferred embodiment as shown in FIG. 1, the mechanism 1 comprises a first lever 4 (lever arm) and a second lever 5 (lever arm). The first lever 4 and the second lever 5 are each rotatably connected to the flap 2 on the one side and to the housing 3 on the other side or mounted on said components. The first lever 4 and the second lever 5 are connected to the flap 2 and the housing 3 in particular by means of or via a first end and a second end, opposite to the first end, of the levers 4, 5. It is important that the mounting points 6, 7, 8, 9 of the first lever 4 and the second lever 5 on the flap 2 on the one side and the housing 3 on the other side are spaced apart from one another. This produces a so-called four-point kinematics, which allows (at least) two movements, in particular (at least) two circular rotational movements having different rotation radii, which can be carried out by the first lever 4 and the second lever 5, to be superposed or overlaid such that the previously described characteristic pivot pattern or pivoting movement of the flap 2 is produced.

The spacing of the mounting points 6, 7, 8, 9 allows the ratio of the rotation angle of the levers 4, 5 to the rotation angle or pivot angle of the flap 2 to be varied or adjusted to obtain the desired orientations of the flap 2 relative to the housing 3 while at the same time requiring only a small movement path of the levers 4, 5.

Each of the levers 4, 5 is designed or configured such that it can carry out one of these circular rotational movements around its mounting point 6, 7 on the housing 3 in a first or a second direction of rotation. The first lever 4 is in particular designed or configured such that it can carry out a circular rotational movement having a rotation radius that is larger than a rotation radius of a circular rotational movement carried out by the second lever 5.

The two levers 4, 5 are curved, preferably gooseneck-shaped, and are furthermore designed or configured complementarily to one another such that the second lever 5 is accommodated or can be accommodated at least partly in the first lever 4, so that an intertwined lever arrangement can be or is formed. According to the embodiment shown in FIG. 1, at least the first lever 4 is configured as a hollow chamber structure which comprises an opening on one surface that is provided to accommodate the second lever 5. This then, when the mechanism 1, the flap 2 and the housing 3 (see FIGS. 2 to 4) are assembled as the arrangement 100 according to the invention, enables a very compact arrangement of the two levers 4, 5, in which the two levers 4, 5 can carry out their rotational movements unimpeded.

As can also be seen in particular in FIG. 1, the second lever 5 can have a special configuration such that, in a state in which it is accommodated in the first lever 4, it at least partly covers the opening provided in the first lever 4 for accommodating the second lever 5. For this purpose, a surface of the second lever 5 is configured such that it projects at least slightly beyond the outer contour of the second lever 4. Such a configuration of the second lever 4 enables the mechanism 1, which comes into contact with the environment when the flap 2 is pivoted, to likewise be protected from weather effects, in particular from entering rain or snow. Other or further geometrical configurations of the levers 4, 5, in particular their surfaces, to protect the mechanism 1 from weather effects when the flap 2 is pivoted are conceivable as well.

Figure 5A:
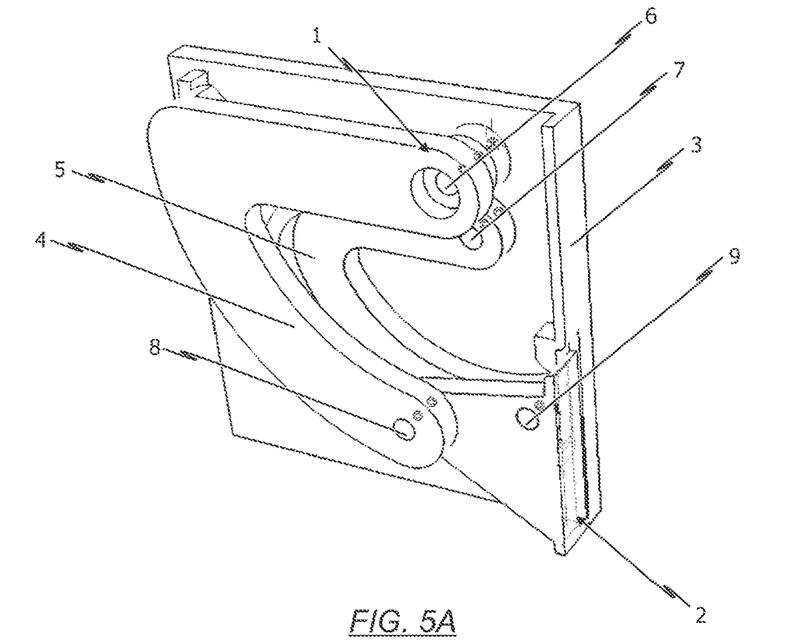
FIGS. 5A to 5C a schematic illustration of a movement sequence of the mechanism according to the invention for pivoting the charging or tank flap.
Figure 5B:
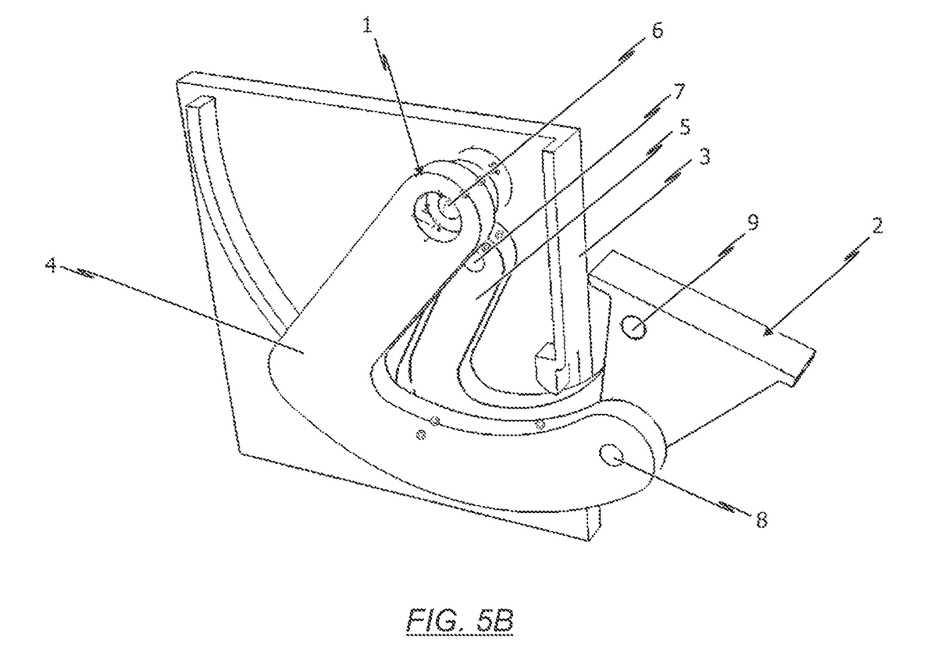
Figure 5C:
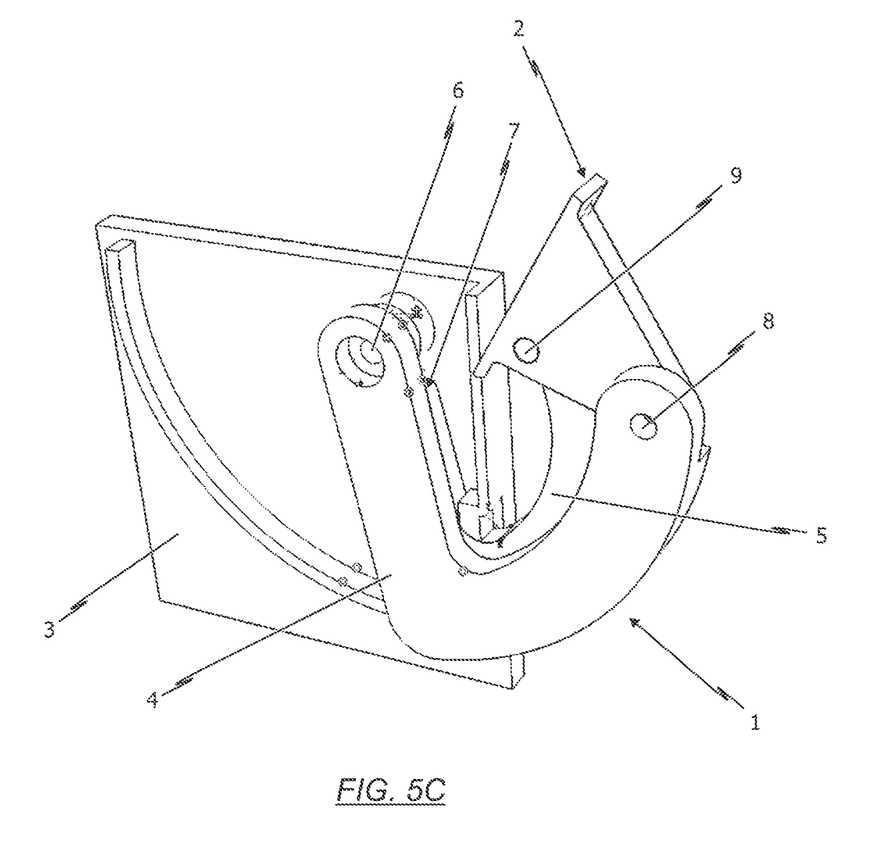

The movement sequence of the mechanism 1 with two, in particular curved, preferably gooseneck-shaped, levers 4, 5, and the corresponding pivoting movement and/or pivot pattern of the flap 2, are described once more in detail in the following with reference to the illustrations in FIGS. 5A to 5C. It should be noted that the illustrations in FIGS. 5A to 5C are intended to be merely schematic and serve the purpose of clarifying the basic movement sequences. Specific embodiments of the mechanism 1 can deviate from such a configuration (see, for example, the embodiment in FIG. 1).

When the mechanism 1 is actuated, in particular when the first lever 4 is actuated, the first lever 4 rotates around its mounting point 6 on the housing 3. As a result of the rotatable mounting of the first lever 4 on the flap 2 and also of the second lever 5 on the housing 3 on the one side and the flap 2 on the other side, the movement introduced into the first lever 4 is transmitted directly to the second lever 5, so that this lever, too, rotates around its mounting point 7 on the housing 3. The rotatable mounting of the first lever 4 and the second lever 5 on the flap 2 allows the flap 2 to rotate relative to the levers 4, 5 during the circular rotational movements of the levers 4, 5. This four-point kinematics allows the circular rotational movements of the levers 4, 5 to be superposed or overlaid such that the flap 2 carries out a translatory or almost translatory movement in the direction away from the housing 3 or away from a surface of the body component accommodating the housing 3 and, at the same time, a rotational movement in the direction of the body component. This makes it possible, in comparison to a conventional arrangement consisting of the housing, the flap, and the mechanism in which the mechanism comprises only one lever, to achieve a significantly greater pivot angle of the flap 2 with the same movement path of the mechanism 1 and to thus free the housing 3 or an opening defined by the housing 3 in an improved manner.

In order for the flap 2 to be pivoted out of its first orientation (closed position) into its second orientation (open position, pivot angle of approximately 155° (+/−10°)), the levers 4, 5 of the mechanism 1 according to the invention only need a rotation angle of approximately 100° (+/−10°), in particular exactly 100°, in their first direction of rotation. In order for the flap 2 to be pivoted out of its first orientation (closed position) into its third orientation (weather protection position, pivot angle of approximately 80° (+/−10°)), the levers 4, 5 of the mechanism 1 according to the invention only need a rotation angle of approximately 55° (+/−10°), in particular exactly 55°, in their first direction of rotation.

Figure 2:
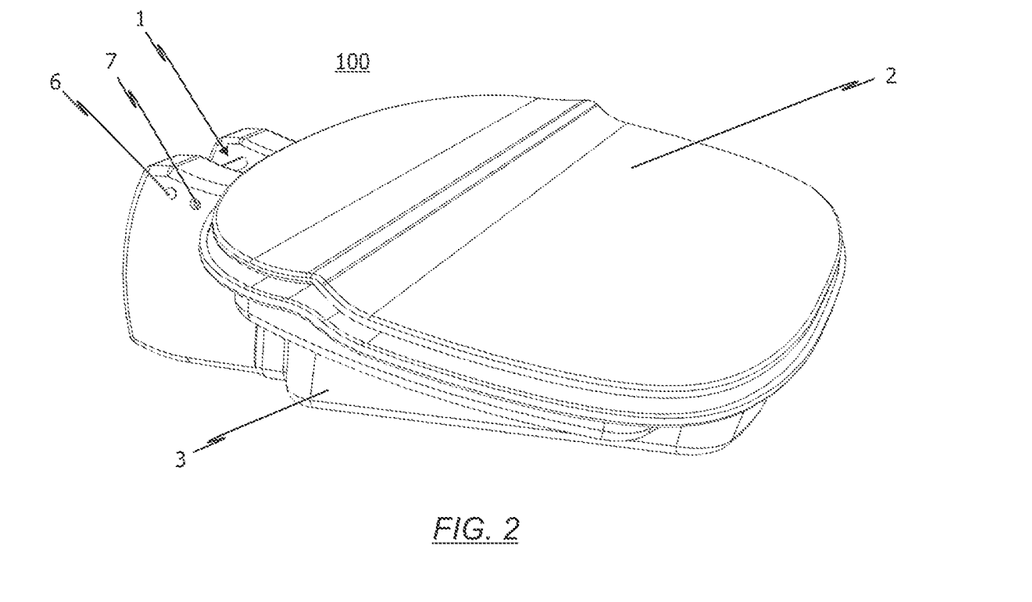
FIG. 2 schematically and in an isometric view, an example embodiment of the arrangement according to the invention consisting of a charging or filler neck housing, a charging or tank flap, and the mechanism according to the invention in a first orientation of the charging or tank flap, in particular in a closed position of a charging or tank flap.
Figure 3:
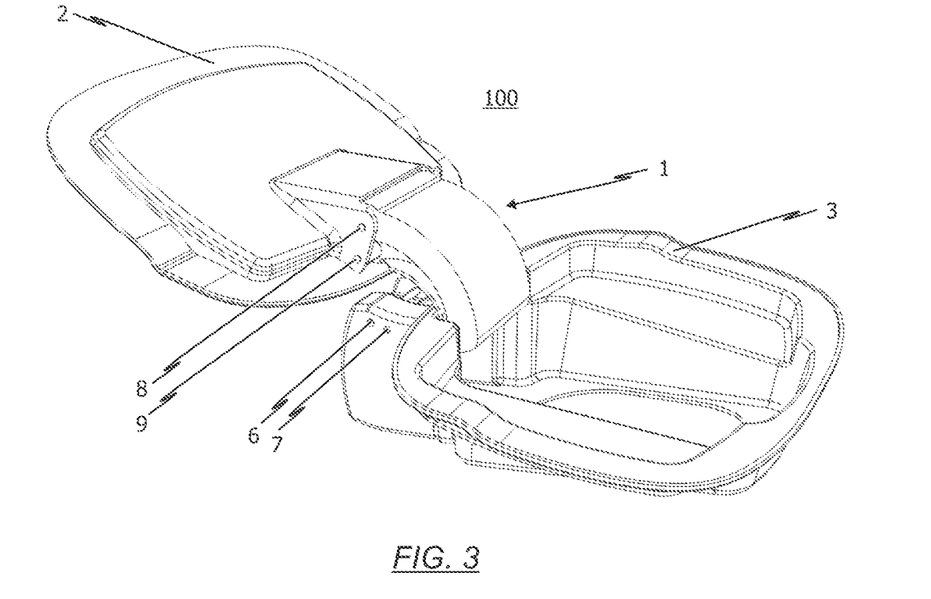
FIG. 3 schematically and in an isometric view, the example embodiment of the arrangement according to the invention consisting of a charging or filler neck housing, a charging or tank flap, and the mechanism according to the invention in a second orientation of the charging or tank flap, in particular an open position of the charging or tank flap.
Figure 4:
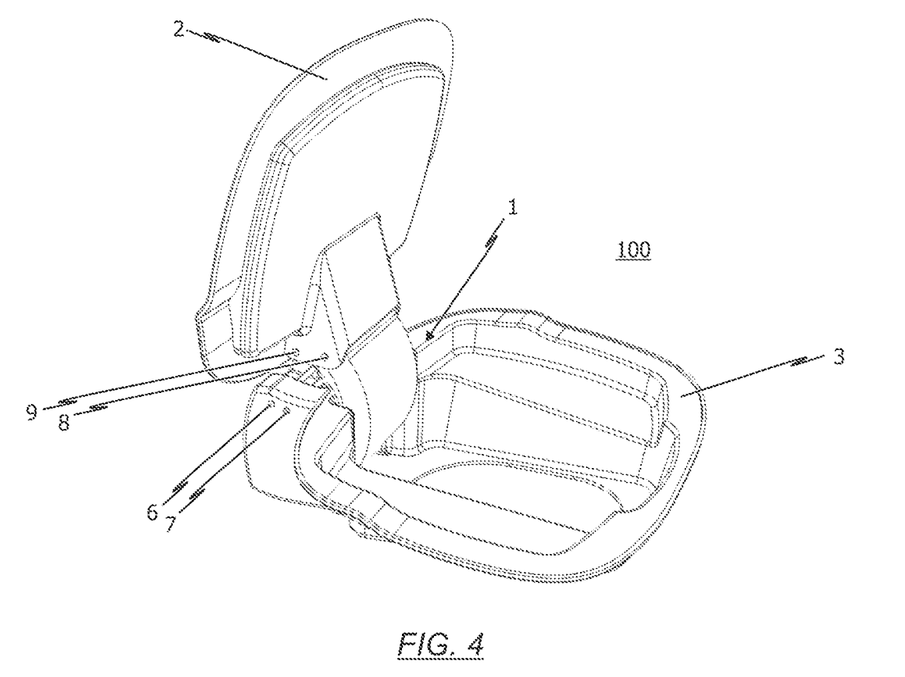
FIG. 4 schematically and in an isometric view, the example embodiment of the arrangement according to the invention consisting of a charging or filler neck housing, a charging or tank flap, and the mechanism according to the invention in a third orientation of the charging or tank flap, in particular in a weather protection position of the charging or tank flap.

As can be seen in particular in FIGS. 2 to 4, in a second orientation (open position and access position) of the flap 2, the levers 4, 5 rest against a surface or a housing part of the housing 3 such that an end stop for the levers 4, 5 is created, thus making it possible to achieve a stable end position of the levers 4, 5 in order to protect the mechanism 1 from damage in the event of an unintentional movement of the flap 2 beyond its maximum open position or pivot position. In this orientation, the first lever 4 also rests against the second lever 5 or the second lever 5 provides an additional stop for the first lever 4.

Because the mechanism 1 according to the invention allows a reversible pivoting of the flap 2, the mechanism 1 is also configured to allow the levers 4, 5 to rotate by corresponding angular amounts of approximately 45° (+/−10°), in particular exactly 45°, and approximately 100° (+/−10°), in particular exactly 100°, in the second direction of rotation in order to move the flap 2 out of the second orientation (open position, pivot angle of approximately 155° (+/−10°)) into the third orientation (weather protection position, pivot angle approximately 80° (+/−10°)) or out of the second orientation (open position, pivot angle approximately 155° (+/−10°)) back into the first orientation (closed position).

As shown in detail in FIGS. 1 to 4, the rotatable mounting or connection of the first lever 4 and the second lever 5 to the flap 2 and the housing 3 is respectively implemented by means of a support pin or a bearing pin 10. This mounting or connection enables a very uncomplicated, inexpensive, yet very robust and durable, type of mounting, which adds a key component to the mode of action according to the invention.

As mentioned previously in the detailed description of the movement sequence with reference to FIGS. 5A to 5C, the mechanism 1 is actuated to initiate the pivoting process of the flap 2. It is preferably provided that the first lever 4 of the mechanism 1 is actuated, wherein said actuation is effected either manually, using spring force, using a Bowden cable and/or using an electric motor. The pivoting movement of the flap 2 is thus initiated via an actuation of the first lever 4, wherein the first lever 4 carries out a circular rotational movement around its mounting point 6 on the housing 3, wherein, due to the further mounting points 8, 9, the second lever 5 likewise directly carries out a circular rotational movement having a smaller rotation radius around its mounting point 7 on the housing 3. The mounting points 8, 9 allow the flap 2 to rotate around said mounting points 8, 9 when the levers 4, 5 rotate and thus carry out its characteristic pivoting movement.

The movements overlaid by the mechanism 1 can be uniform or non-uniform in nature. Non-uniform movements enable the implementation of additional functions, such as gentle opening and/or closing of the flap 2 (soft opening/soft closing), rapid pivoting of the flap 2 between its end positions or end orientations and/or pivoting of the flap 2 against a resistance, for example an ice barrier or strong wind. For this purpose, an additional gear component or an additional gearing, for example a Maltese cross type gear, can be provided, which produces said non-uniform movement and introduces said movement into the mechanism, in particular into one of the levers 4, 5 of the mechanism 1. Alternatively, it is also conceivable to produce the non-uniform movement directly by means of an electric motor. However, the use of an additional gear component or gearing is not limited to the purpose of producing a non-uniform movement; it can also be used for uniform movements, for example to obtain a higher torque when pivoting or faster pivoting speeds.

When the mechanism 1 is actuated manually, additional catch fastenings or springs can be provided to at least temporarily secure or fix the flap 2 in the first, second and/or third orientations.

Even though the second and third orientations of the flap 2 have been described by a rotation angle or pivot angle of approximately 155° (+/−10°) and approximately 80° (+/−10°) in the direction of a body component accommodating the housing 3, it is of course conceivable that the second and third orientations of the flap 2 can also describe any other pivot angle. The second orientation of the flap 2 can in particular correspond to a rotation angle or pivot angle in the range of 110° to 180° and the third orientation of the flap 2 to a rotation angle or pivot angle in the range of 60° to 100° in the direction of a body component accommodating the housing 3. The levers 4, 5 of the mechanism 1 have to accordingly carry out a smaller or larger rotational movement around their respective mounting points 6, 7 on the housing 3, but the rotation angle of the levers 4, 5 is always smaller than the rotation angle or pivot angle of the flap 2.

FIGS. 2 to 4 show an arrangement 100 consisting of a housing 3, a flap 2, and the mechanism 1 according to the invention and illustrate the different orientations of the flap 2 relative to the housing 3, namely the first orientation (see FIG. 2), the second orientation (see FIG. 3) and the third orientation (see FIG. 4). It is in principle also conceivable for an arrangement 100 to consist of a housing 3, at least one flap 2 and at least one mechanism 1 according to the invention. According to a further aspect of the invention, an arrangement 100 consisting of a housing 3, a flap 2 and two mechanisms 1 according to the invention can be specified. In that case, the mechanisms 1 are disposed spaced apart from one another in the arrangement 100, but are configured in the same way, so that they also carry out the same movement sequence. In such a configuration of the arrangement 100, the levers 4, 5 of the mechanisms 1 can have special surface configurations to provide additional protection against entering liquids or snow, in particular in combination with strong wind. It is in particular provided that the surfaces of the levers 4, 5 that face outward, i.e. in the direction of the body component accommodating the housing 3, when the flap 2 is open (second or third orientation), have this special configuration for weather protection.

It should be noted that, as an alternative to the embodiment described in detail of the mechanism 1 comprising two levers 4, 5, each of which carries out a circular rotational movement, a mechanism 1 based on the principle of superposing or overlaying a circular rotational movement and a linear movement to achieve the characteristic pivoting movement or pivot pattern of the flap 2 lies within the scope of the invention as well. The levers 4, 5 have to then be configured accordingly. In such a configuration or mode of action of the mechanism 1, unlike in the case of two circular rotational movements, the outer surface of the flap 2, i.e. a surface of the flap 2 which in the first orientation (closed position) of the flap 2 faces away from a surface of the body component, does not face in the direction of the body component in its second orientation (open position or access position); instead the inner surface of the flap 2, i.e. a surface of the flap 2 which in the first orientation (closed position) of the flap 2 faces in the direction of a surface of the body component, still faces in the direction of the body component in the second orientation (open position or access position).

The invention is also not limited to only two movements being superposed or overlaid, it is in principle also conceivable for more than two movements to be superposed by the mechanism 1 and lead to the characteristic pivoting movement or the characteristic pivot pattern of the flap 2. For this purpose, the mechanism 1 can correspondingly comprise more than two levers 4, 5 and/or also further or other components.

The invention is not limited to the example embodiments of the mechanism according to the invention and the arrangement according to the invention, but results when all of the features disclosed herein are considered together.

The invention further relates to a motor vehicle comprising at least one arrangement 100 consisting of a housing 3, at least one flap 2 and at least one mechanism 1 of the type described above.

LIST OF REFERENCE SIGNS

1 Mechanism
2 Flap
3 Housing
4 First lever
5 Second lever
6, 7 Mounting points of the levers on the housing
8, 9 Mounting points of the levers on the flaps
10 Support pin or bearing pin

What is claim is:

1. A mechanism for pivoting a charging or tank flap on a charging or filler neck housing which is configured to be accommodated in a body component of a motor vehicle,
    wherein the mechanism is configured to pivot the charging or tank flap reversibly between a first orientation, in a closed position of the charging or tank flap, and a second orientation, in an open position of the charging or tank flap;
    wherein the mechanism comprises a first lever and a second lever,
    wherein the first lever and the second lever are each rotatably mounted on the charging or tank flap on one side and on the charging or filler neck housing on the other side, with a first end and a second end opposite to the first end,
    wherein mounting points of the first lever and the second lever on the charging or tank flap on the one side and the charging or filler neck housing on the other side are respectively spaced apart from one another;
    wherein the first lever is configured to carry out a first circular rotational movement about the mounting point of the first lever on the charging or filler neck housing, and the second lever is configured to carry out a second circular rotational movement around the mounting point of the second lever on the charging or filler neck housing, in each case, in a first or a second direction of rotation, wherein the first circular rotational movement and the second circular rotational movement are superposed so as to occur at least temporarily simultaneously;
    wherein the first circular rotational movement has a rotation radius that is larger than a rotation radius of the second circular rotational movement.

2. The mechanism according to claim 1,
    wherein the mechanism is configured, during pivoting from the first orientation into the second orientation, to simultaneously lift the charging or tank flap from the charging or filler neck housing and rotate it in the direction of the body component.

3. The mechanism according to claim 1,
    wherein the mechanism is rotatably mounted on the charging or tank flap on the one side and on the charging or filler neck housing on the other side.

4. The mechanism according to claim 1,
    wherein the mechanism is configured to pivot the charging or tank flap into a third orientation,
    wherein the third orientation corresponds to an orientation of the charging or tank flap between the first and the second orientation.

5. The mechanism according to claim 1,
    wherein a rotation angle of the mechanism corresponds to a first rotation angle range,
    wherein a rotation angle of the charging or tank flap corresponds to a second rotation angle range,
    wherein the rotation angle of the mechanism is always smaller than the rotation angle of the charging or tank flap.

6. The mechanism according to claim 1,
    wherein a pivoting of the charging or tank flap from the first orientation into the second orientation corresponds to a pivoting movement of the charging or tank flap by a pivot angle of approximately 155° in the direction of the body component,
    wherein a pivoting of the charging or tank flap from the first orientation into the third orientation corresponds to a pivoting movement of the charging or tank flap by a pivot angle of approximately 80° in the direction of the body component,
    wherein the second orientation of the charging or tank flap corresponds to a rotation angle of the levers of approximately 100° in the first direction of rotation,
    wherein the third orientation of the charging or tank flap corresponds to a rotation angle of the levers of approximately 55° in the first direction of rotation.

7. The mechanism according to claim 1,
    wherein the first lever and the second lever are configured complementarily to one another such that the second lever is accommodated or can be accommodated at least partly in the first lever, and wherein the second lever is preferably configured such that, in a state of the second lever in which it is accommodated in the first lever, an opening formed in the first lever for accommodating the second lever is covered at least partly by the second lever.

8. The mechanism according to claim 1, wherein the first lever and the second lever are both curved so as to be gooseneck-shaped.

9. The mechanism according to claim 1, wherein the first lever and the second lever are respectively rotatably mounted by means of a support pin or bearing pin on the charging or tank flap on the one side and the charging or filler neck housing on the other side.

10. The mechanism according to claim 1, wherein the movements superposed by the mechanism are non-uniform.

11. The mechanism according to claim 1, wherein a pivoting of the charging or tank flap is initiated by actuating the first lever.

12. An arrangement comprising a charging or filler neck housing, which is accommodated in a body component of a motor vehicle, including at least one charging or tank flap and at least one mechanism according to claim 1.

13. A motor vehicle including at least one arrangement according to claim 12.

14. A mechanism for pivoting a charging or tank flap on a charging or filler neck housing which is configured to be accommodated in a body component of a motor vehicle,
wherein the mechanism has a first component with a first circular rotational movement and a second component with a second circular rotational movement, wherein the first circular rotational movement and the second circular rotational movement are superposed so as to occur at least temporarily simultaneously, wherein the first circular rotational movement the second circular rotational movement have different rotation radii, wherein the mechanism is configured to pivot the charging or tank flap reversibly between a first orientation, in a closed position of the charging or tank flap, and a second orientation, in an open position of the charging or tank flap;
wherein a rotation angle of the mechanism corresponds to a first rotation angle range,
wherein a rotation angle of the charging or tank flap corresponds to a second rotation angle range,
wherein the rotation angle of the mechanism is always smaller than the rotation angle of the charging or tank flap.

* * * * *